(12) United States Patent
Webster et al.

(10) Patent No.: US 7,779,992 B2
(45) Date of Patent: Aug. 24, 2010

(54) SHOPPING CART CONVEYOR SYSTEM WITH PIVOTING LUG

(75) Inventors: Mark R. Webster, Hubertus, WI (US); Gene M. Barth, Glendale, WI (US); Patrick Kelnhofer, Wauwatosa, WI (US)

(73) Assignee: Pflow Industries, Inc., Milwaukee, WI (US)

( * ) Notice: Subject to any disclaimer, the term of this patent is extended or adjusted under 35 U.S.C. 154(b) by 116 days.

(21) Appl. No.: 11/961,394

(22) Filed: Dec. 20, 2007

(65) Prior Publication Data

US 2009/0159402 A1    Jun. 25, 2009

(51) Int. Cl.
*B65G 19/26* (2006.01)

(52) U.S. Cl. .................. 198/732; 198/321; 104/172.3; 186/58

(58) Field of Classification Search ............... 198/732, 198/321; 104/172.3; 186/58
See application file for complete search history.

(56) References Cited

U.S. PATENT DOCUMENTS

| | | | |
|---|---|---|---|
| 2,109,210 | A | 2/1938 | Dunlop |
| 2,802,427 | A | 8/1957 | Costa |
| 2,965,049 | A | 12/1960 | Royer |
| 3,305,064 | A | 2/1967 | Mullis et al. |
| 3,318,432 | A | 5/1967 | Mullis et al. |
| 3,395,784 | A | 8/1968 | Kanarek |
| 3,446,315 | A | 5/1969 | Close |
| 3,580,376 | A | 5/1971 | Loshbough |
| 3,655,013 | A | 4/1972 | Weller |
| 3,656,636 | A | 4/1972 | Konstantin |
| 3,799,327 | A * | 3/1974 | Schulz .................. 198/718 |
| 3,861,514 | A | 1/1975 | Ling |
| 3,947,832 | A | 3/1976 | Rosgen et al. |
| 4,004,680 | A * | 1/1977 | Warmann .................. 198/732 |

(Continued)

FOREIGN PATENT DOCUMENTS

CH    403224    11/1965

(Continued)

OTHER PUBLICATIONS

Pending U.S. Appl. No. 12/059,453, filed Mar. 31, 2008.

*Primary Examiner*—Mark A Deuble
(74) *Attorney, Agent, or Firm*—Michael Best & Friedrich LLP

(57) ABSTRACT

A shopping cart conveyor system that moves a shopping cart from one location to another along a path. The system includes a frame, a track coupled to the frame, and a conveyor coupled to the frame and having an engagement member (e.g., multiple engagement members) adapted to engage a shopping cart. The engagement member is movable (e.g., pivotable) relative to the track from a first position, where the engagement member will engage and move the shopping cart along the path, and a second position, where the engagement member is capable of releasing engagement of the shopping cart. Preferably, the engagement member is biased toward the first position (e.g., by a resilient member). In one embodiment, the engagement member includes an engagement surface adapted to engage the shopping cart and defining an engagement angle between the engagement surface and a reference axis parallel to the path. In this embodiment, the engagement angle is acute when the engagement member is in the first position and is obtuse when the engagement member is in the second position.

9 Claims, 5 Drawing Sheets

U.S. PATENT DOCUMENTS

| | | |
|---|---|---|
| 4,206,708 A | 6/1980 | Behle |
| 4,235,327 A | 11/1980 | Heusler et al. |
| 4,326,622 A | 4/1982 | Ellzey |
| 4,438,830 A | 3/1984 | Born |
| 4,518,072 A | 5/1985 | Muellner et al. |
| 4,681,207 A | 7/1987 | Goto et al. |
| 5,473,991 A * | 12/1995 | Crum ..................... 104/172.3 |
| 5,476,156 A | 12/1995 | Gerber |
| 5,572,930 A | 11/1996 | Hein |
| 5,785,165 A | 7/1998 | Stahlhut et al. |
| 5,923,005 A | 7/1999 | Blondiau et al. |
| 5,996,767 A | 12/1999 | Misawa |
| 6,138,815 A | 10/2000 | Reiners et al. |
| 6,334,522 B2 | 1/2002 | Haruta et al. |
| 6,378,693 B1 * | 4/2002 | Ballestrazzi et al. ........ 198/732 |
| 6,490,979 B1 | 12/2002 | Pfleger et al. |
| 6,644,210 B1 | 11/2003 | Pfleger et al. |
| 2007/0205859 A1 | 9/2007 | Webster |

FOREIGN PATENT DOCUMENTS

| | | |
|---|---|---|
| DE | 1249765 | 9/1967 |
| DE | 2456791 | 8/1976 |
| DE | 2916818 | 11/1980 |
| EP | 0012149 | 4/1979 |

* cited by examiner

SHOPPING CART CONVEYOR SYSTEM WITH PIVOTING LUG

BACKGROUND

The present invention relates to a tow conveyor for moving shopping carts between two different floors of a building. More specifically, the present invention relates to an inclined shopping cart conveyor that can be positioned adjacent to a people-moving escalator such that the shopping cart conveyor moves the shopping carts between two different floors of a building to coincide with the movement of the shoppers.

Currently, many large department stores occupy single-floor buildings that include many different product departments and thus have a footprint that covers tens of thousands of square feet. In these large department stores, shoppers typically use shopping carts to carry selected merchandise throughout the store while the shopper continues to select merchandise from the various departments within the store. Since a shopper may be selecting a large number of items having substantial weight, shopping carts are essential in the current department store environment.

Large single-floor department stores are often located in suburban areas where enough land is available to build a store large enough to include all of the merchandise to be offered by the retailer. Many large department store chains have been unable to open stores in populated urban areas due to the unavailability of large blocks of land for single-floor retail space. In these same urban areas, there are often a number of smaller land lots or multi-floor vacant buildings that would be large enough to accommodate the floor space required by the department store.

Additionally, many department stores prefer a single checkout location where all shoppers enter or exit the store. For these and other reasons, a multi-floor department store that is capable of utilizing shopping carts and having a single checkout location is desirable.

U.S. Pat. No. 6,490,979 filed Dec. 10, 2002 discloses an inclined shopping cart conveyor system and is hereby incorporated by reference.

SUMMARY OF THE INVENTION

The present invention provides a shopping cart conveyor system that moves a shopping cart from one location to another along a path. The system includes a frame, a track coupled to the frame, and a conveyor coupled to the frame and having an engagement member (e.g., multiple engagement members) adapted to engage a shopping cart. The engagement member is movable (e.g., pivotable) relative to the track from a first position, where the engagement member will engage and move the shopping cart along the path, and a second position, where the engagement member is capable of releasing engagement of the shopping cart. Preferably, the engagement member is biased toward the first position (e.g., by a resilient member). In one embodiment, the engagement member includes an engagement surface adapted to engage the shopping cart and defining an engagement angle between the engagement surface and a reference axis parallel to the path. In this embodiment, the engagement angle is acute when the engagement member is in the first position and is obtuse when the engagement member is in the second position.

The above-referenced system can be used to perform a method that reduces the likelihood of damage to the conveyor and shopping cart in the event that the shopping cart gets jammed in the system. The method includes engaging the engagement member with a shopping cart, translating the engagement member and shopping cart along a path, resisting movement of the shopping cart (e.g., shopping cart gets jammed), moving (e.g., pivoting) the engagement member from the first position (acute angle) to the second position (obtuse angle), and disengaging the shopping cart from the engagement member. In one embodiment, disengaging includes sliding the shopping cart relative to the engagement member.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
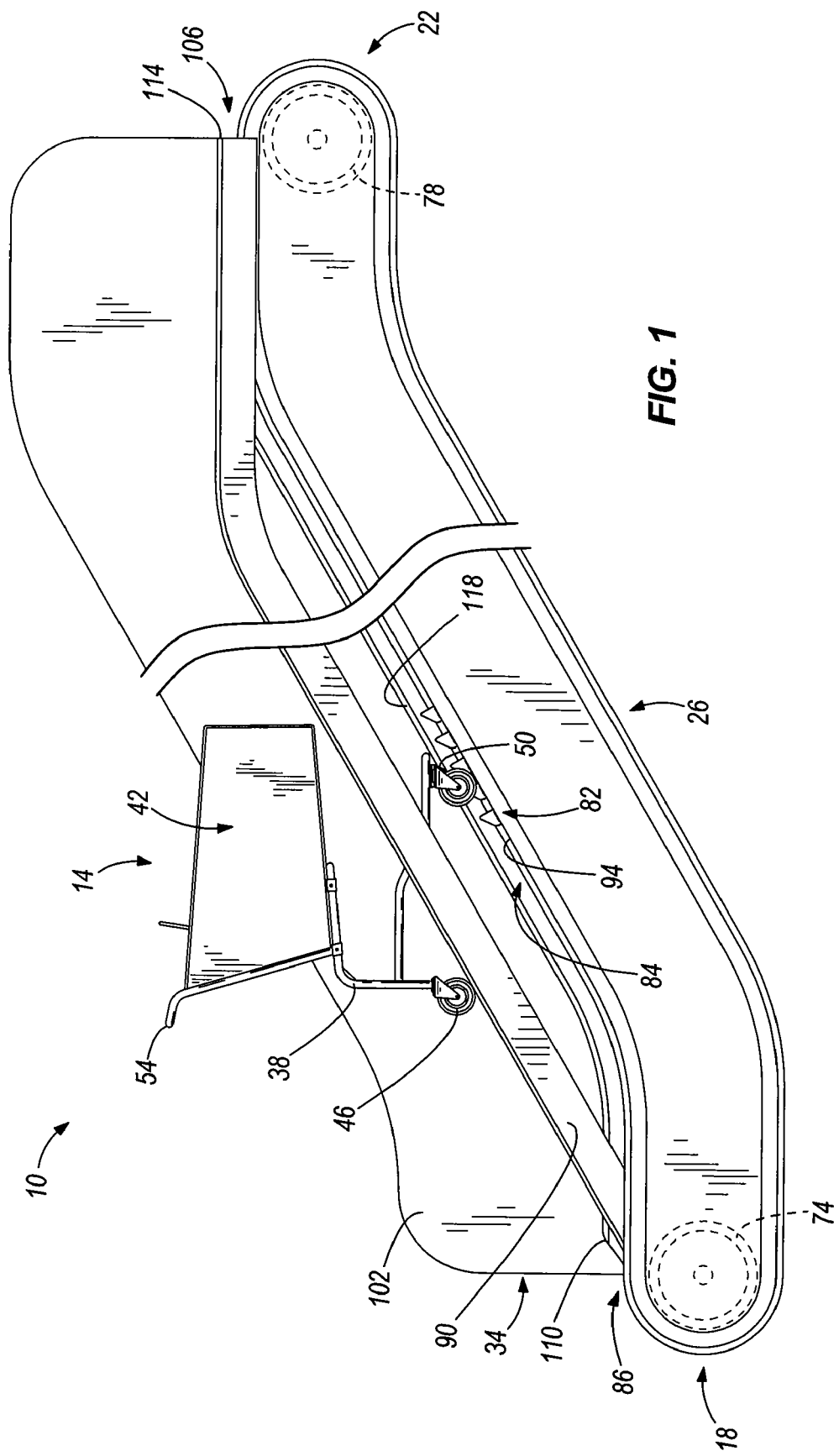
FIG. 1 is a side view of a shopping cart conveyor system.

FIG. 1 shows a shopping cart conveyor system 10 that moves a shopping cart 14 between a first level and a second level. The illustrated shopping cart conveyor system 10 includes a conveyor assembly 26 and a frame 34.

The illustrated shopping cart 14 is similar to those found in typical retail stores and includes a cart frame 38, an item holding area 42 attached to the cart frame 38, four wheels 46 attached to the cart frame 38, and a support bar 50. The cart frame 38 is constructed of bent metal tube sections and defines a handle portion 54 that a user may use to control the shopping cart 14. The cart frame 38 also supports the other components of the shopping cart 14.

The item holding area 42 is constructed from plastic and wire, and includes four cart side walls and a cart bottom such that items may be placed into the item holding area 42 and inhibited from inadvertently leaving the item holding area 42. The item holding area 42 and the cart frame 38 are designed such that they can support the items placed into the item holding area 42.

The four wheels 46 roll over the ground and allow a user to easily maneuver the shopping cart 14. The rear two wheels 46 are held in a fixed forward direction and the front two wheels 46 are free to rotate. In other constructions, all the wheels 46 may be fixed or free to rotate. In addition, more than four wheels 46 or less than four wheels 46 may be attached to the cart frame 38.

In other constructions, a different shopping cart may be used with the shopping cart conveyor system 10. Many other shopping cart designs exist as is well known by those skilled in the art.

Figure 3:
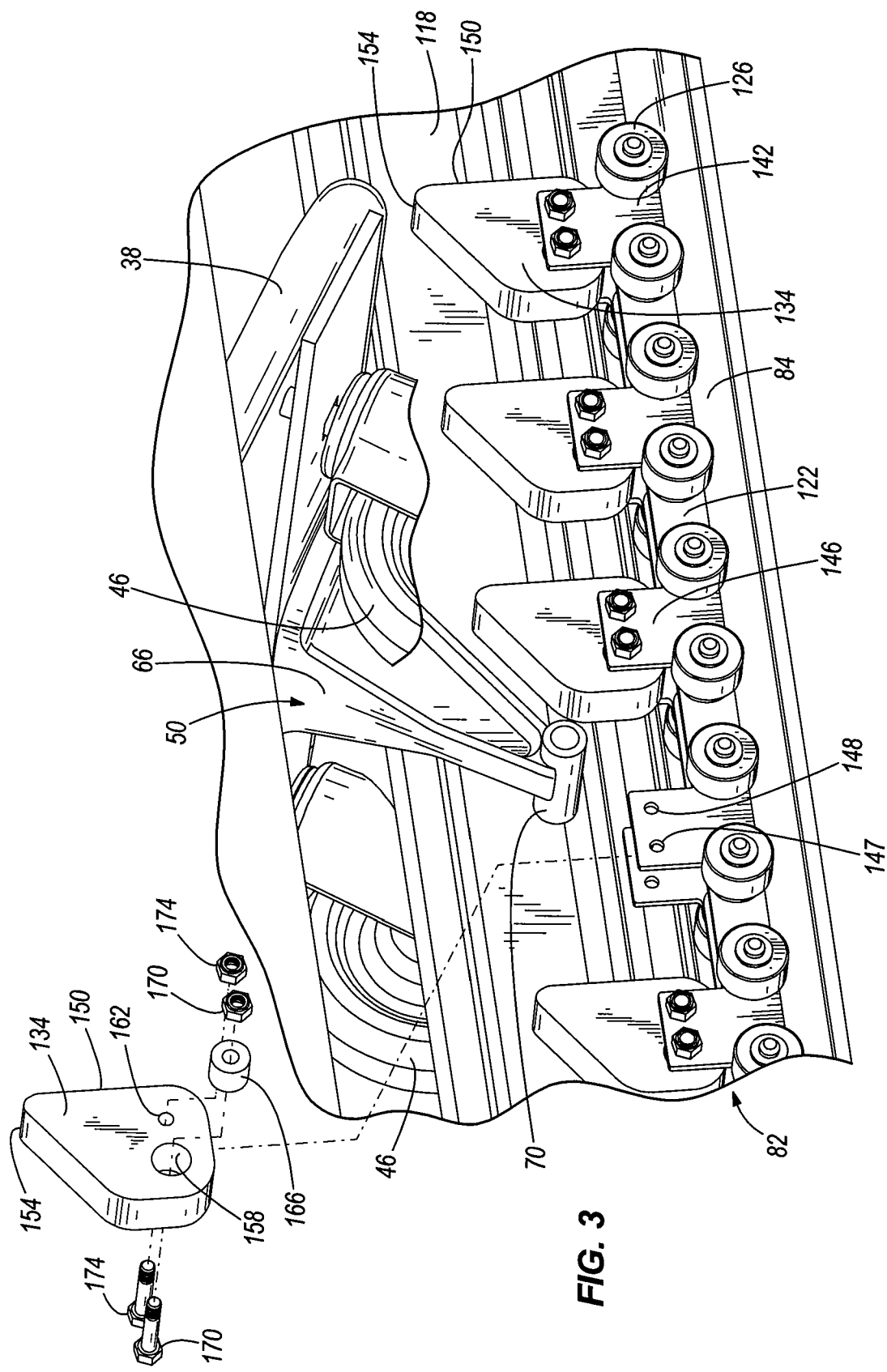
FIG. 3 is an enlarged partial view of the shopping cart conveyor system of FIG. 2 with an engagement member exploded from a conveyor chain assembly.

As is best seen in FIG. 3, the support bar 50 is attached to the cart frame 38 between the front two wheels 46 and is directly connected to the cart frame 38 with two fasteners. The support bar 50 includes a reinforcing section 66 that extends away from the cart frame 38 toward the ground and a cross bar section 70 that extends from the reinforcing section 66 parallel to the ground. In other constructions, the support bar 50 may be formed as a single piece with the cart frame 38 or may include a plurality of separate pieces coupled together to form the support bar 50. In addition, the support bar 50 may be positioned at different angles with respect to the ground. Furthermore, the support bar 50 may be directly connected to the cart frame 38 in other ways (e.g. welding).

With continued reference to FIG. 1, the illustrated conveyor assembly 26 includes a drive motor (not shown), a driven roller 74 coupled to the drive motor with a gear reducer (not shown), an idler roller 78, and a conveyor chain assembly 82 coupled to and supported by the driven roller 74 and the idler roller 78. The drive motor is controlled by a conveyor controller (not shown) such that the driven roller 74 is turned via the gear reducer and turns at a substantially equal speed throughout operation of the conveyor assembly 26. In other constructions, a drive belt, a chain, or another component may couple the drive motor to the driven roller 74. In addition, the drive motor may be directly connected to the driven roller 74.

The driven roller 74 and idler roller 78 are supported by conveyor supports (not shown) of the frame 34. In other constructions, a plurality of support rollers are supported by the frame 34 and guide the conveyor chain assembly 82 such that it follows a desired path.

The illustrated conveyor chain assembly 82 engages the support bar 50 such that the shopping cart 14 is moved by the conveyor assembly 26 between the first level and the second level. The conveyor chain assembly 82 is guided by a guide track 84 of the frame 34 along the desired path. In other constructions, the conveyor chain assembly 82 may be a belt that is guided by the support rollers.

The illustrated frame 34 includes a loading portion 86 at the first level, a pair of rear wheel tracks 90, a pair of front wheel tracks 94, the guide track 84, a side wall 102, and an unloading portion 106 at the second level. The illustrated loading portion 86 is substantially level and provides an area for the user to easily push the shopping cart 14 onto the conveyor assembly 26. In other constructions, the loading portion 86 may be at a different elevation or angle with respect to the ground as well as different lengths and widths.

The pair of rear wheel tracks 90 support the rear wheels 46 of the shopping cart 14 such that the rear wheels 46 may roll on the rear wheel tracks 90 while the shopping cart 14 is moving between the first level and the second level. The pair of front wheel tracks 94 support the front wheels 46 of the shopping cart 14 such that the front wheels 46 may roll on the front wheel tracks 94 while the shopping cart 14 is moving between the first level and the second level. The front wheel tracks 94 are positioned in relation with the rear wheel tracks 90 such that the shopping cart 14 is supported in a substantially level position while the shopping cart 14 is moving between the first level and the second level. In other constructions, the shopping cart 14 may be supported at other angles as desired. In addition, the rear wheel tracks 90 and the front wheel tracks 94 may be positioned at different widths to accommodate different shopping carts.

The guide track 84 receives the support bar 50 of the shopping cart 14 and houses the conveyor chain assembly 82. The guide track 84 extends the length of the shopping cart conveyor system 10 from the first level to the second level and defines a first end 110 at the loading portion 86, a second end 114 at the unloading portion 106, and a cover portion 118 between the first end 110 and the second end 114.

The first end 110 is shaped such that the cross bar section 70 of the support bar 50 may enter the guide track 84 and engage the conveyor chain assembly 82. The second end 114 is shaped such that the conveyor chain assembly 82 may disengage the cross bar section 70 of the support bar 50 and the shopping cart 14 may exit the shopping cart conveyor system 10.

Figure 5:
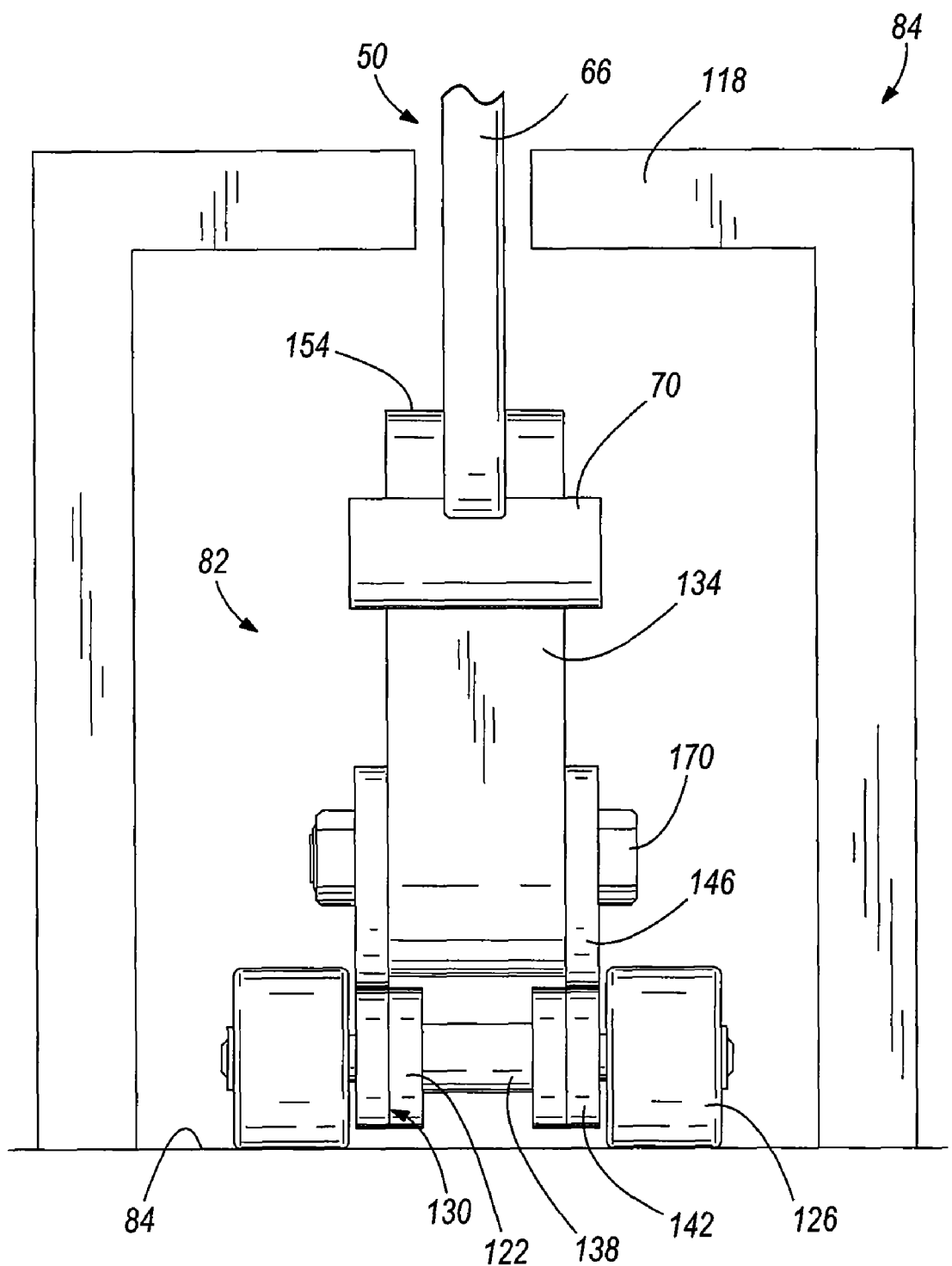
FIG. 5 is a partial sectional view of the shopping cart conveyor system taken at the section line 5-5 in FIG. 4.

The support bar 50 extends through the cover portion 118 such that the cross bar section 70 is disposed within the guide track 84 and is not substantially visible from outside the guide track 84. As shown in FIG. 5, the cover portion 118 substantially covers the conveyor chain assembly 82 such that access to the conveyor chain assembly 82 in the cover portion 118 is inhibited. The cover portion 118 also aligns the shopping cart 14 on the front wheel tracks 94 and the rear wheel tracks 90 such that the shopping cart 14 moves between the first level and the second level in a substantially straight line on the desired path. In other constructions, the guide track 84 may be other shapes with the conveyor chain assembly 82 uncovered.

The side wall 102 extends the length of the shopping cart conveyor system 10 and is positioned such that access from the side is inhibited. In other constructions, more than one side wall 102 may be included or the side wall 102 may be removed.

Figure 2:
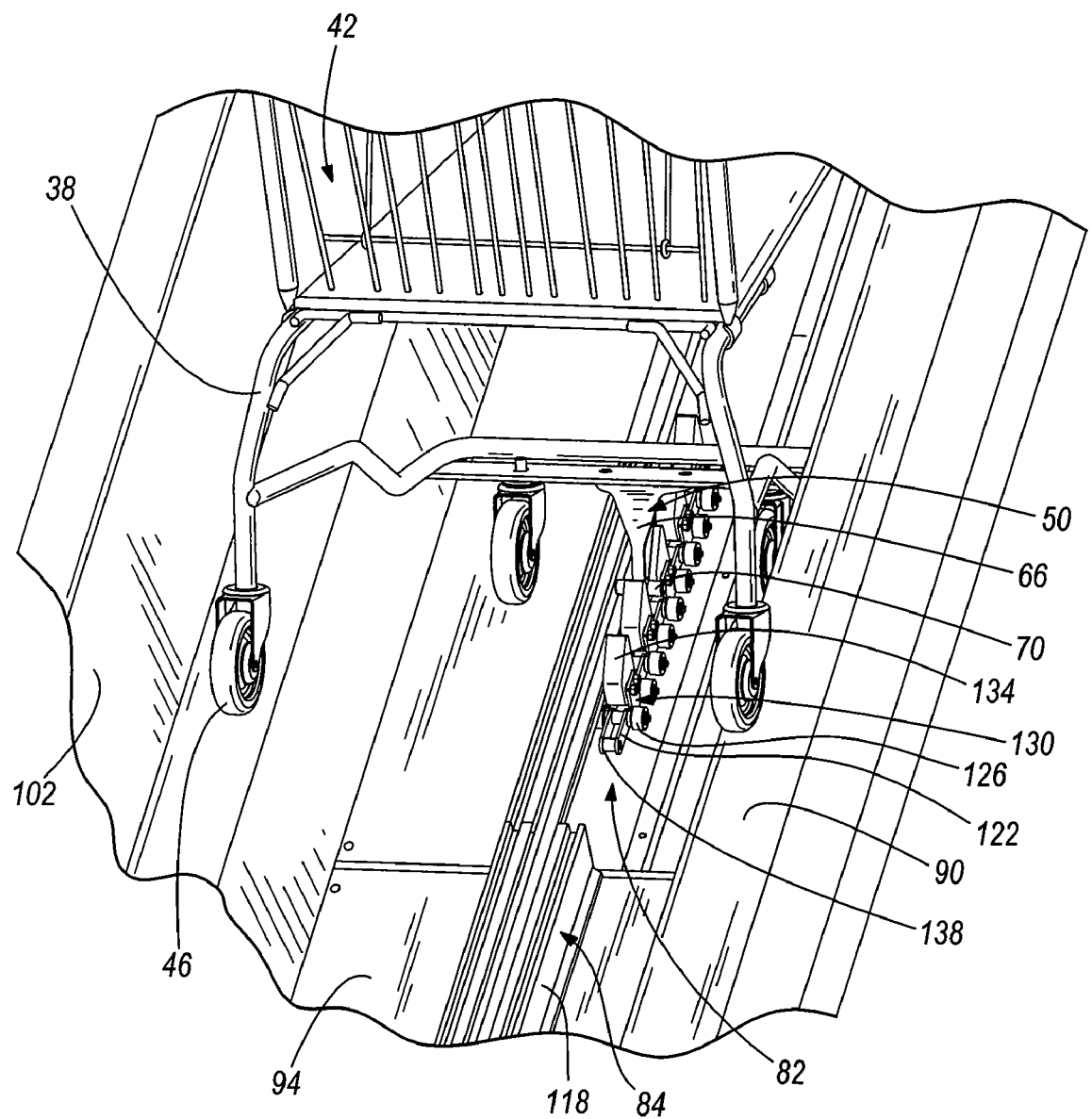
FIG. 2 is a partial rear perspective view of the shopping cart conveyor system of FIG. 1.

Turning now to FIGS. 2 and 3, a portion of the guide track 84 has been cut away such that a portion of the conveyor chain assembly 82 is visible. The conveyor chain assembly 82 includes chain link members 122, rollers 126, mounting members 130, and engagement members 134. The chain link members 122 connect the mounting members 130 together such that the conveyor chain assembly 82 may flex around the driven roller 74 and the idler roller 78 to form a continuous chain that is flexible about pivots 138. The rollers 126 are mounted on the pivots 138 on both sides of the conveyor chain assembly 82 and roll on the guide track 84 so as to maintain the conveyor chain assembly 82 in contact with the desired path. Fasteners hold the rollers 126 to the pivots 138 such that the rollers 126 may rotate.

The mounting members 130 include a chain portion 142 and an attachment portion 146. The chain portion 142 connects at the pivot 138 to the chain link members 122 and the attachment portion 146 defines a first attachment aperture 147 and a second attachment aperture 148. In other constructions, less than two apertures or more than two apertures are conceivable.

The engagement members 134 include a front surface 150, a top portion 154, a first aperture 158, a second aperture 162, and a biasing element 166. The engagement members 134 are attached to the mounting members 130 by aligning the first aperture 158 and the second aperture 162 of each engagement member 134 with the first attachment aperture 147 with the second attachment aperture 148, respectively, of each mounting member. The biasing element 166 is an elastomeric ring and is positioned in the first aperture 158. A first fastener 170 is inserted through the first aperture 158, the biasing element 166, and the first attachment aperture 147 such that the engagement member 134 is secured. A second fastener 174 is engages the second aperture 162 and the second attachment aperture 148 such that the second aperture 162 and the second attachment aperture 148 are inhibited from inadvertently becoming misaligned. In other constructions, the biasing element 166 can be other elements such as a spring, a linear extension, a leaf spring, or other biasing device. In addition, the biasing element 166 may be positioned at least partially outside the first aperture. Furthermore, the first fastener 170 and the second fastener 174 could be other fasteners or any number of fasteners.

Figure 4:
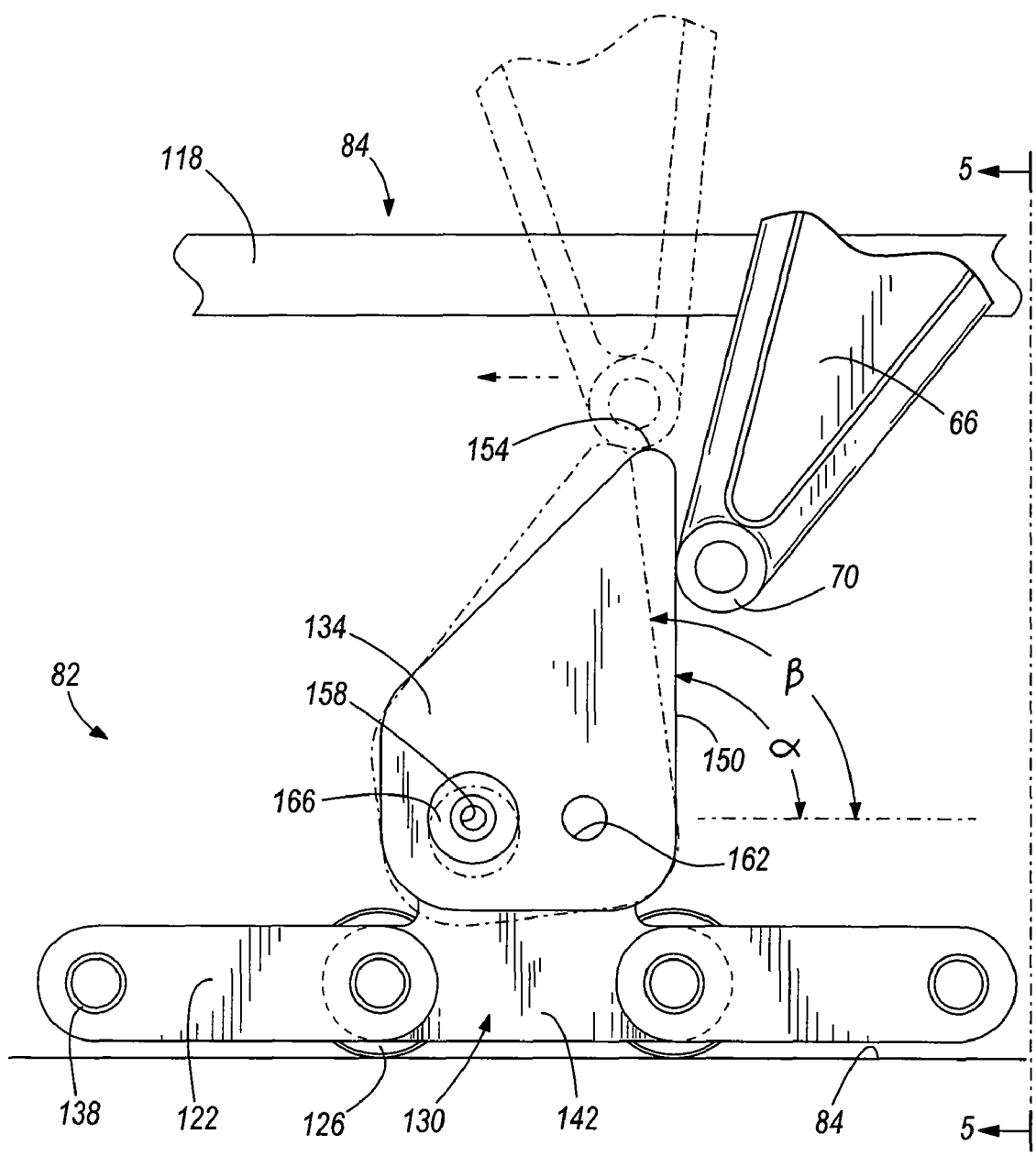
FIG. 4 is an enlarged side view of the engagement member in a first position and a second position, with fasteners removed for clarity.

As is best seen in FIG. 4, each engagement member 134 is rotatable between a first position (solid lines in FIG. 4) and a second position (broken lines in FIG. 4). In the first position, the front surface 150 forms an acute angle α with respect to the direction of motion of the conveyor chain assembly 82. While in the first position, the front surface 150 engages the support bar 50 of a shopping cart 14 and moves the shopping cart 14 with the engagement member 134 such that the shopping cart 14 follows the desired path and moves from the first level to the second level. In the illustrated embodiment the angle α is about 85 degrees. It should be understood that the precise angle α can vary considerably from the angle listed above. The goal is to make sure the engagement member 134 is able to move the shopping carts under normal operating conditions.

If the shopping cart 14 becomes jammed or is otherwise inhibited from moving, the engagement member 134 pivots about the second fastener 174 in the second aperture 162 to the second position in which the front surface 150 forms an obtuse angle β with respect to the direction of motion of the conveyor chain assembly 82. While in the second position, the support bar 50 can disengage from the front surface 150 and slide over the top portion 154 while the cross bar section 70 is still disposed within the guide track 84 and the biasing element 166 is compressed. This allows a shopping cart 14 that is jammed to disengage from the conveyor chain assembly 82 such that it does not damage the conveyor chain assembly 82, the shopping cart 14, or any other components of the shopping cart conveyor system 10. In the illustrated embodiment, the angle β is greater than 90 degrees. In other constructions, the first position and second position may form other angles. The precise angle at which the shopping cart will rise and disengage the engagement member depends on a variety of factors, such as the friction between the front surface 150 and the support bar 50. Furthermore, the shape of the engagement member 134 may be different that what is illustrated, and the engagement member 134 can move in other manners (e.g., sliding).

The engagement members 134 may be unbolted from the conveyor chain assembly 82 and easily replaced if broken. In addition, the chain link members 122, the mounting members 130, and the rollers 126 may easily be replaced if broken.

Thus, the invention provides, among other things, a shopping cart conveyor system. Various features and advantages of the invention are set forth in the following claims.

What is claimed is:

1. A shopping cart conveyor assembly comprising:
a frame;
a track coupled to the frame;
a shopping cart mounted on the track and movable relative to the track along a path; and
a conveyor coupled to the frame and having an engagement member engaged with the shopping cart and translatable generally along the path, the engagement member being movable relative to the track in response to a force from the shopping cart from a first position, where the engagement member will engage and move the shopping cart along the path, and a second position, where the engagement member is capable of releasing engagement of the shopping cart, wherein the engagement member includes an engagement surface adapted to engage the shopping cart and defining an engagement angle between the engagement surface and a reference axis parallel to the path, and wherein the engagement angle is acute when the engagement member is in the first position and is obtuse when the engagement member is in the second position.

2. A shopping cart conveyor assembly as claimed in claim 1, where the conveyor comprises multiple engagement members spaced generally along the path.

3. A shopping cart conveyor assembly as claimed in claim 1, wherein the engagement member is biased toward the first position.

4. A shopping cart conveyor assembly as claimed in claim 3, wherein the engagement member includes a resilient member that biases the engagement member toward the first position.

5. A shopping cart conveyor assembly as claimed in claim 1, wherein the engagement member pivots between the first position and the second position.

6. A method of operating a shopping cart conveyor having an engagement member for moving a shopping cart between a loading portion and an unloading portion, the method comprising:
engaging the engagement member with a shopping cart at the loading portion;
translating the engagement member and shopping cart along a path toward the unloading portion;
resisting movement of the shopping cart;
moving the engagement member from a first position to a second position prior to reaching the unloading portion;
disengaging the shopping cart from the engagement member prior to reaching the unloading portion; and
returning the engagement member to the first position prior to reaching the unloading portion.

7. A method as claimed in claim 6, wherein engaging including contacting an engagement surface of the engagement member with the shopping cart, the engagement surface defining an engagement angle between the engagement surface and a reference axis parallel to the path, and wherein moving includes changing the engagement angle from an acute angle when the engagement member is in the first position to an obtuse angle when the engagement member is in the second position.

8. A method as claimed in claim 6, wherein moving the engagement member includes pivoting the engagement member.

9. A method as claimed in claim 6, wherein disengaging includes sliding the shopping cart relative to the engagement member.

* * * * *